(12) United States Patent
Liu

(10) Patent No.: US 11,163,356 B2
(45) Date of Patent: Nov. 2, 2021

(54) DEVICE-FACING HUMAN-COMPUTER INTERACTION METHOD AND SYSTEM

(71) Applicant: Guohua Liu, Guangdong (CN)

(72) Inventor: Guohua Liu, Guangdong (CN)

( * ) Notice: Subject to any disclaimer, the term of this patent is extended or adjusted under 35 U.S.C. 154(b) by 0 days.

(21) Appl. No.: 16/614,694

(22) PCT Filed: May 15, 2018

(86) PCT No.: PCT/CN2018/086805
§ 371 (c)(1),
(2) Date: Nov. 18, 2019

(87) PCT Pub. No.: WO2018/210219
PCT Pub. Date: Nov. 22, 2018

(65) Prior Publication Data
US 2020/0209950 A1    Jul. 2, 2020

(30) Foreign Application Priority Data

May 18, 2017   (CN) .......................... 201710354064.5

(51) Int. Cl.
*G06F 3/01*     (2006.01)
*G06F 3/16*     (2006.01)
(Continued)

(52) U.S. Cl.
CPC .............. *G06F 3/011* (2013.01); *G06F 3/167* (2013.01); *G06K 9/00335* (2013.01); *H04N 21/44218* (2013.01); *G06K 9/00221* (2013.01)

(58) Field of Classification Search
CPC ..... G06F 3/011; G06F 3/167; G06K 9/00221; G06K 9/00335; H04N 21/44218
See application file for complete search history.

(56) References Cited

U.S. PATENT DOCUMENTS

| 8,965,170 B1* | 2/2015 | Benea | ................ G06K 9/00268 386/224 |
| 2002/0105575 A1* | 8/2002 | Hinde | ..................... G10L 15/24 348/14.01 |

(Continued)

FOREIGN PATENT DOCUMENTS

| CN | 102324035 | 1/2012 |
| CN | 103413467 | 11/2013 |

(Continued)

OTHER PUBLICATIONS

International Search Report issued for International Patent Application No. PCT/CN2018/086805, dated Jul. 19, 2018, 5 pages including English translation.

(Continued)

*Primary Examiner* — Liliana Cerullo
(74) *Attorney, Agent, or Firm* — Hamre, Schumann, Mueller & Larson, P.C.

(57) ABSTRACT

A device-facing human-computer interaction method and system is provided. The method includes acquiring device-facing image data acquired by an image acquisition device when a user is in a device-facing state relative to the device; acquiring current image data of the user and comparing the currently acquired image data with the device-facing image data; if the currently acquired image data is consistent with the device-facing image data, identifying a user behavior and intention by means of a device-facing recognition technique and a voice recognition technique of a computer; and according to a preset correspondence between the user behaviors and intention and an operation, controlling the device to perform an operation corresponding to the current user behavior and intention.

8 Claims, 4 Drawing Sheets

(51) Int. Cl.
    *H04N 21/442*    (2011.01)
    *G06K 9/00*      (2006.01)

(56) References Cited

U.S. PATENT DOCUMENTS

| | | | |
|---|---|---|---|
| 2005/0001024 A1* | 1/2005 | Kusaka | G06F 3/04883 |
| | | | 235/375 |
| 2010/0217590 A1 | 8/2010 | Nemer et al. | |
| 2011/0071830 A1 | 3/2011 | Kim et al. | |
| 2013/0307771 A1 | 11/2013 | Parker et al. | |
| 2014/0176662 A1* | 6/2014 | Goodman | H04N 7/141 |
| | | | 348/14.07 |
| 2015/0331490 A1* | 11/2015 | Yamada | G10L 25/78 |
| | | | 345/156 |
| 2017/0090584 A1* | 3/2017 | Tang | G06F 3/165 |
| 2018/0233141 A1* | 8/2018 | Solomon | G06F 3/167 |
| 2019/0325865 A1* | 10/2019 | Oktem | G10L 13/00 |
| 2020/0202856 A1* | 6/2020 | Ivanov Bonev | G10L 15/08 |

FOREIGN PATENT DOCUMENTS

| | | |
|---|---|---|
| CN | 105700683 | 6/2016 |
| CN | 106125771 | 11/2016 |
| CN | 106356057 | 1/2017 |
| CN | 107239139 | 10/2017 |
| EP | 1215658 | 6/2002 |
| EP | 2801972 | 11/2014 |

OTHER PUBLICATIONS

Extended European Search Report issued for European Patent Application No. 18803148.8, dated Feb. 1, 2021, 10 pages.

* cited by examiner

DEVICE-FACING HUMAN-COMPUTER INTERACTION METHOD AND SYSTEM

TECHNICAL FIELD

The disclosure relates to the field of human-computer interaction technology, in particular to a human-computer interaction method and system based on a direct view.

BACKGROUND

Human-computer interaction refers to the process of information exchange between a person and a device that performs a certain task by using a certain dialogue language and interacting with the device in a certain way.

With the development of science and technology, the application field of human-computer interaction technology is becoming wider and wider, such as the playing button of radio, the instrument panel on airplane or the control room of power plant. Users can communicate with and operate the system through the human-computer interaction interface. At present, in the human-computer interaction technology, the mainstream human-computer interaction modes mainly include three types: the first is the traditional key-pressing mode; the second is the specific voice word activation mode, such as, saying "hello, Xiaobing" before starting dialogue, such that the device can recognize the speech later; the third is "raising your hand to speak" in which a specific gesture is first used to allow the device to initiate speech recognition.

In the above-mentioned human-computer interaction mode, although the human-computer interaction function can be realize to a certain extent, because the interaction mode is single and a certain specific gesture action needs to be set in advance, the interaction process is not very natural and the operation of the user is inconvenient to a certain extent.

SUMMARY

Accordingly, in order to solve the problem that the general human-computer interaction mode is single and unnatural and the user is inconvenient to operate, it is necessary to provide a human-computer interaction method and a system based on a direct view that has various human-computer interaction mode and natural interaction process and that brings convenient operation to users.

A human-computer interaction method based on a direct view includes the step of:

acquiring direct view image data collected by an image acquisition device when a user and a device are in a relative direct view state;

collecting current image data of the user in real time by the image acquisition device, and comparing the collected current image data with the direct view image data;

determining the user and the device being in the relative direct view state when the collected current image data is consistent with the direct view image data; and recognizing behavior and intention of the user by a visual recognition technology and a speech recognition technology of a computer when the user and the device are in the relative direct view state, performing, by a control device, an operation corresponding to the current behavior and the intention of the user according to a preset corresponding relationship between the current behavior and the intention of the user and the operation, wherein the visual recognition technology and the speech recognition technology of the computer includes face recognition, speech recognition, semantic understanding, gesture recognition, lip recognition, voiceprint recognition, expression recognition, age recognition, card recognition, face tracking, pupil recognition, and iris recognition.

A human-computer interaction system based on a direct view includes:

an acquiring module, configured to acquire direct view image data collected by an image acquisition device when a user and a device are in a relative direct view state;

a comparison module, configured to collect current image data of the user in real time by the image acquisition device, and comparing the collected current image data with the direct view image data;

a determination module, configured to determine the user and the device being in the relative direct view state when the collected current image data is consistent with the direct view image data; and a control module, configured to recognize behavior and intention of the user by a visual recognition technology and a speech recognition technology of a computer when the user and the device are in the relative direct view state, performing, by a control device, an operation corresponding to the current behavior and the intention of the user according to a preset corresponding relationship between the current behavior and the intention of the user and the operation, wherein the visual recognition technology and the speech recognition technology of the computer includes face recognition, speech recognition, semantic understanding, gesture recognition, lip recognition, voiceprint recognition, expression recognition, age recognition, card recognition, face tracking, pupil recognition, and iris recognition.

In the human-computer interaction method and system based on the direct view according to the present disclosure, the direct view image data collected by an image acquisition device is acquired when the user and the device are in the relative direct view state. The current image data of the user is collected and the collected current image data is compared with the direct view image data. When the collected current image data is consistent with the direct view image data, the user and the device are determined in the relative direct view state. The behavior and the intention of the user are recognized by the visual recognition technology and the speech recognition technology of the computer. The control device performs the operation corresponding to the current behavior and the intention of the user according to the preset corresponding relationship between the current behavior and the intention of the user and the operation. In the whole process, the image data collected by the image acquisition device is used for direct view determination, and the direct view state determination between the user and the device is taken as a precondition of human-computer interaction to ensure that the current user does have human-computer interaction requirement. The whole human-computer interaction process is natural. In addition, a variety of action recognition methods, such as, face recognition and speech recognition gesture recognition, lip recognition, voiceprint recognition, facial expression recognition, age recognition, card recognition pupil recognition and iris recognition are adopted to recognize the next action of the user, which can realize various human-computer interaction and bring convenient operation to users.

DETAILED DESCRIPTION OF THE EMBODIMENTS

Figure 1:
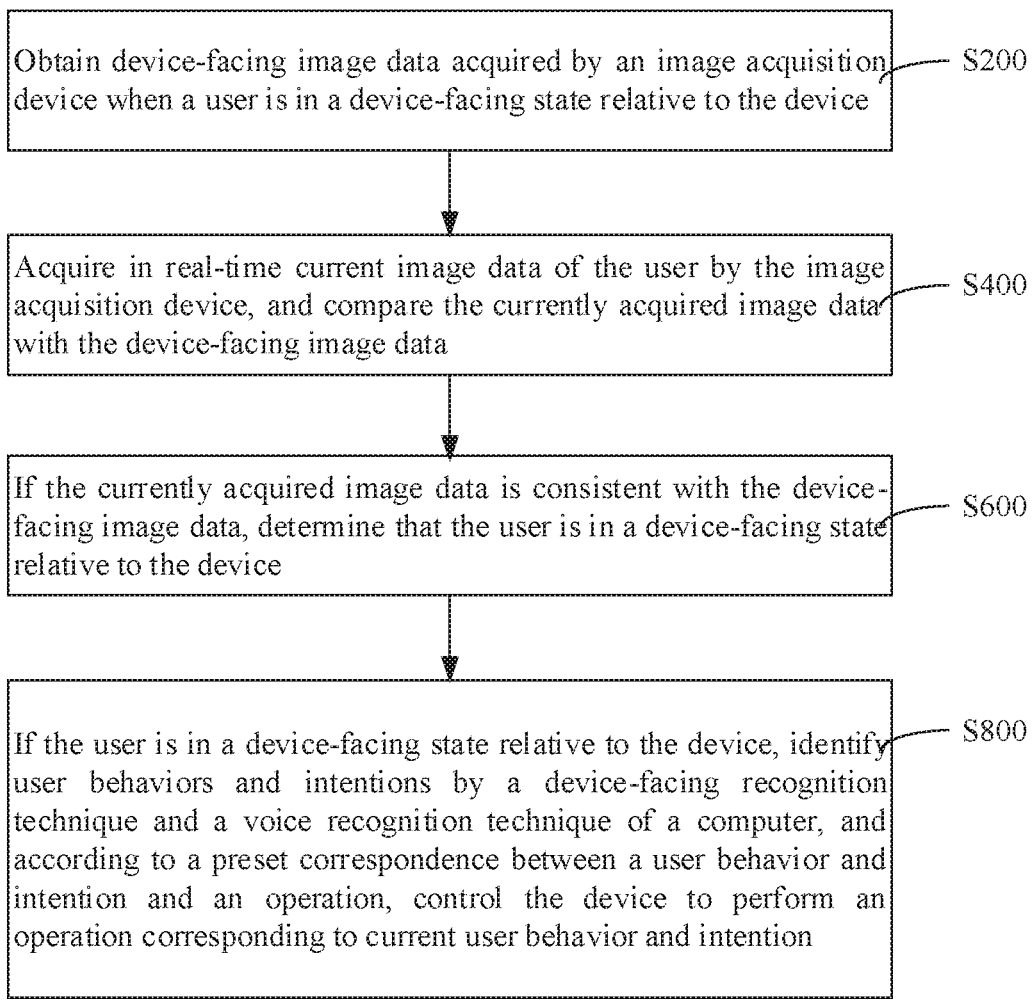
FIG. 1 is a flow chart of a human-computer interaction method based on a direct view according to a first embodiment of the present disclosure.

As shown in FIG. 1, a human-computer interaction method based on a direct view includes the step of:

In step S200, when a user and a device are in a relative direct view state, direct view image data which is collected by an image acquisition device is acquired.

The device may specifically be a television, an air conditioner, a computer, and a robot, etc., in addition, the device may also include a vehicle-mounted device, etc. The user and the device in the relative direct view state means that the user looks at the device directly. For example, when the device is the television, the state when the user faces and watches the television directly is the user and the television in the relative direct view state. Since the image acquisition device normally is not arranged in the center of the device, when the image acquisition device collects an image when the user and the device are in the relatively direct view state, the eyes or face of the user are not facing the image acquisition device directly in view of the image acquisition device, and a certain angle is generally presented. In order to facilitate subsequent accurate determination of the direct view state, the direct view image data collected by the image acquisition device of the user and the device in the relative direct view state are firstly acquired. Specifically, the direct view image data of the user and the device in the relative direct view state may be the data collected in the history record or may be the data collected on the spot. The image acquisition device may be a camera or the like. Herein, the direct view image data of the user and the device in the relative direct view state is an image collected by the image acquisition device, which may be provided on the device, an auxiliary device or a peripheral device. For example, when the device is the television, the image acquisition device may be provided on the television or a set top box coupled with the television. More specifically, the camera captures the direct view image data in the relative direct view state of the user and the device, after performing image processing and image object coordinate conversing to the direct view image data, the relative position of the device and the face of the user can be determined. In other word, the face image data of the user and the device in the relative direct view state can be acquired. Determining whether the user and the device are in the relative direct view state may be implemented by using technologies such as head pose estimation or gaze tracking.

In step S400, current image data of the user in real time is collected by the image acquisition device, and the collected current image data is compared with the direct view image data.

The current image data of the user in real time is collected by the same image acquisition device in step S200, and the image data collected in real time is compared with the direct view image data collected in step S200 to determine whether the current user and the device are in the relative direct view state.

In step S600, the user and the device are determined in the relative direct view state when the collected current image data is consistent with the direct view image data.

When the direct view image data acquired in step S200 is consistent with the image data collected in real time in step S400, it is determined that the current user and the device are in the relative direct view state.

In step S800: behavior and intention of the user are recognized by a visual recognition technology and a speech recognition technology of a computer when the user and the device are in the relative direct view state, and a control device performs an operation corresponding to the current behavior and the intention of the user according to a preset corresponding relationship between the current behavior and the intention of the user and the operation. The visual recognition technology and the speech recognition technology of the computer include face recognition, speech recognition, semantic understanding, gesture recognition, lip recognition, voiceprint recognition, expression recognition, age recognition, card recognition, face tracking, pupil recognition, and iris recognition.

Under the premise that the user and the device are in the relative direct view state, the behavior and the intention of the user are recognized by the visual recognition technology and the speech recognition technology of the computer. The control device performs the operation corresponding to the current behavior and the intention of the user according to the preset corresponding relationship between the current behavior and the intention of the user and the operation. In other words, only on the premise that the user and the device are in the relative direct view state, the device will start to respond to the user operation. In this way, it can avoid erroneous operation on one hand, for example, avoid erroneous turning on of the television, erroneous switch of television programs, and the like, on the other hand, when the user and the device are in the relative direct view state, it is great likely that the user will operate the device, which facilitates the user. In particular, the computer vision recognition technology and the speech recognition technology may mainly include face recognition, face detection, face tracking, speech recognition, gesture recognition, lip recognition, voiceprint recognition, expression recognition, age recognition, card recognition, pupil recognition, and iris recognition, etc. The above-mentioned rich computer vision recognition technology and speech recognition technology can realize human-computer interaction from face, speech, pupil, gesture and so on, further enrich the user life and bring convenient operation to the user.

In the human-computer interaction method based on the direct view according to the present disclosure, the direct view image data collected by an image acquisition device is acquired when the user and the device are in the relative direct view state. The current image data of the user is collected and the collected current image data is compared with the direct view image data. When the collected current image data is consistent with the direct view image data, the user and the device are determined in the relative direct view state. The behavior and the intention of the user are recognized by the visual recognition technology and the speech recognition technology of the computer. The control device performs the operation corresponding to the current behavior and the intention of the user according to the preset corresponding relationship between the current behavior and the intention of the user and the operation. In the whole process, the image data collected by the image acquisition device is used for direct view determination, and the direct view state determination between the user and the device is used as a precondition of human-computer interaction to ensure that the current user does have human-computer interaction requirement. The whole human-computer interaction process is natural. In addition, a variety of action recognition methods, such as face recognition, speech recognition gesture recognition, lip recognition, voiceprint recognition, facial expression recognition, age recognition, card recognition, pupil recognition, and iris recognition are adopted to recognize the next action of the user, which can realize various human-computer interaction and bring convenient operation to users.

Figure 2:
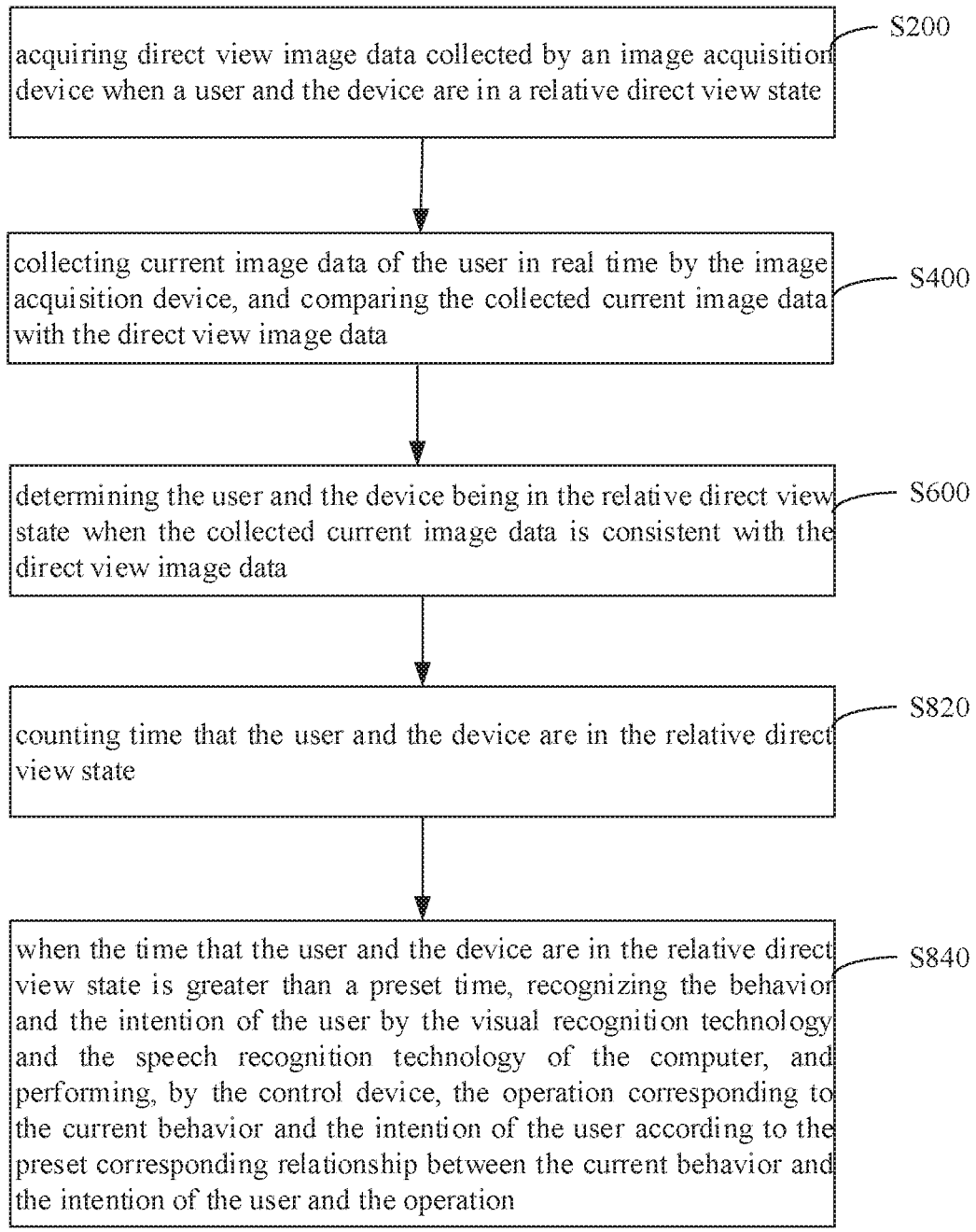
FIG. 2 is a flow chart of the human-computer interaction method based on the direct view according to a second embodiment of the present disclosure.

As shown in FIG. 2, in one of the embodiments, step S800 includes:

In step S820, time that a user and a device are in the relative direct view state is counted.

In step S840, when the time that the user and the device are in the relative direct view state is greater than a preset time, behavior and intention of the user are recognized by the visual recognition technology and the speech recognition technology of the computer. The control device performs an operation corresponding to the current behavior and the intention of the user according to the preset corresponding relationship between the current behavior and the intention of the user and the operation.

The preset time is a predetermined time threshold, and may be set according to the actual situation, for example, 2 seconds, 3 seconds, 5 seconds, and the like. When it is determined in step S600 that the user and the device are in the relative direct view state, the time that the user and the device are in the relative direct view state starts to count. When the user and the device are in the relative direct view state is greater than the preset time, it means it is highly possible that the user needs to perform the next operation on the display setting. At this time, the behavior and the intention of the user are recognized by the visual recognition technology and the speech recognition technology of the computer. The control device performs operation corresponding to the current behavior and the intention of the user according to the preset corresponding relationship between the current behavior and the intention of the user and the operation, such as, activating the device. Face recognition, pupil recognition, iris recognition and other technologies can be used to determine that the user and the device maintain the relative direct view state, that is, maintaining the direct view state also belongs to a user action. Optionally, after the device is activated, the face recognition technology is adopted to recognize the user identity and find video image data matching the user identity, and the control device displays the found video image data. In actual application, when the device is a television, the time that the user maintains a relative direct view state with the television is counted, that is, the time that the user faces the screen of the television is counted. When the time that the user and the television are in the direct view state is greater than a preset time (e.g., 2 seconds), the television is started, the identity of the user is recognized, a favorite television program of the current user is found, and the television is controlled to switch to this television program and play the program.

In particular, in the actual application scenario, the above-mentioned embodiment is as follow: "direct view state"+ time, that is, the user "direct views" the television for a certain time, such as 2 seconds, it can be determined that the user wants to watch the television program, and the television may be activated from standby to play the program. The television can also greet and communicate with the user actively. It can also be: "direct view state"+time+"face recognition" that is, the user can be recognized, the television can play the favorite program. The television can also call the user and communicate with the user actively.

In one of the embodiments, the step of recognizing the behavior and the intention of the user by the visual recognition technology and the speech recognition technology of the computer, and performing, by the control device, the operation corresponding to the current behavior and the intention of the user according to the preset corresponding relationship between the current behavior and the intention of the user and the operation includes:

In step 1, speech recognition and lip recognition are performed to the user.

In step 2, when a speech recognition result is consistent with a lip recognition result, the control device responds to the speech operation of the user.

The lip recognition is performed to the user who is in front of the device and in the "direct view state", and the speech recognition is performed on the detected speech information. The lip recognition result is compared with the speech recognition result, and when the lip recognition result is consistent with the speech recognition result, it can be determined that the user in direct view state is talking to the device (television), and the control device makes a corresponding response. When the lip recognition result is not consistent with the speech recognition result, the device does not respond.

The step of recognizing the behavior and the intention of the user by the visual recognition technology and the speech recognition technology of the computer, performing, by the control device, the operation corresponding to the current behavior and the intention of the user according to the preset corresponding relationship between the current behavior and the intention of the user and the operation includes:

In step 1, speech recognition and semantic understanding are performed to the user.

In step 2, when a speech recognition result and a semantic understanding result are consistent with a current scene of the device, the control device responds to the speech operation of the user.

In the embodiment, it is also necessary to perform the speech recognition and the semantic understanding to the user to understand user intention. When the speech recognition result and the semantic understanding result are consistent with the current scene of the device, the control device responds to the speech operation of the user. For example, when the user is watching the television, if the user says: "I will rest tomorrow", obviously the user is not operating the television, the television does not respond. If the user says: "channel one of China Central Television", he obviously wants to switch to the channel one of China Central Television.

In actual application, the speech recognition and the lip recognition are performed to the user A using the television being a device as an example. That is, on one hand, the speech information sent by the user A is collected, and on the other hand, the lip recognition to the user A is performed based on the direct view state. When the speech recognition result is consistent with the lip recognition result, it is determined that the user A is interacting with the television, and the television is controlled to make a corresponding response, such as switching the television program, adjusting volume of the television, and the like.

In one of the embodiments, when the collected current image data is consistent with the direct view image data, prior to the step of determining the user and the device being in the relative direct view state, the method further includes:

In step 1, a face position of the user is located as a sound source position when the user is detected.

In step 2, a sound acquisition device is oriented towards the sound source position.

The step of recognizing the behavior and the intention of the user by the visual recognition technology and the speech recognition technology of the computer, performing, by the control device, the operation corresponding to the current behavior and the intention of the user according to the preset corresponding relationship between the current behavior and the intention of the user and the operation includes:

When the collected user sound data carries a speech operation instruction, the speech operation instruction is extracted, and the control device performs an operation corresponding to the speech operation instruction.

When the user is detected, the face position of the user is located as the sound source position. The sound acquisition device is oriented towards the sound source position, and is ready to collect the sound data of the user. In particular, the process specifically is to detect face position based on face detection and tracking technologies, and locates the position as the sound source position. In subsequent operations, when it is determined that the current user and the device are in the relative direct view state, the speech data of the user is collected to perform speech recognition. When the collected speech data of the user carries speech operation instruction, the speech operation instruction is extracted, and the control device performs an operation corresponding to the speech operation instruction. In addition, the user can be detected by detection methods, such as face detection, face tracking, and human body detection and so on. When the face position is detected, the face position of the user is set as the sound source position. In actual application, the sound acquisition device may be an array microphone, which is oriented towards the sound source position to collect user speech data. When the collected user speech data carries speech operation instruction (for example, "next channel"), the speech operation instruction is extracted, and the control device performs the operation correspond to the speech operation instruction. More specifically, in an actual application scenario, such as when multiple people watch television, multiple people may look at the television. If multiple people speak at the same time, the future array microphone (which can track multiple targets like radar) can record multiple sound sources. Number and the position of the user can be detected by human face detection and the like, that is, the number and the position of user are the number and the position of the target sound source. The array microphone is provided with the position information of the target sound source, and face identity recognition is combined to collect the sound of several people at the same time and distinguish content spoke by who. When the operation instruction of "next channel" is carried in the sound data of the user, the television is controlled to switch to the next channel. In addition, the face identity recognition can also be combined to identify authority of the user identity. The sound data sent only by the authorized user (having controlling right) can be collected, and subsequent operations can be performed.

In the human-computer interaction method based on the direct view according to the present disclosure, the direct view state is taken as a "switch" for subsequent processing. Only when it is determined that the user and the device are in the relative direct view state, the subsequent operations, such as starting record, speech recognition, or the speech recognition result can be performed.

In addition, in one of the embodiments, when the collected current image data is consistent with the direct view image data, after the step of determining the user and the device being in the relative direct view state, the method further includes:

In step 1, an operation instruction inputted by the user is received, the operation instruction includes a non-direct view state operation instruction and a direct view state operation instruction.

In step 2, the non-direct view state operation instruction inputted by the user is responded to when detecting the user is no longer in the direct view state.

In step 3, the direct view state operation instruction inputted by the user is responded to when detecting the user is detected in the direct view state again.

In actual application, the television receives an operation instruction inputted by the user, which can specifically be the user inputting the operation instruction through a remote controller, a direct touch button, or clicking a touch display area set on the television. The operation instruction is divided into the non-direct view state operation instruction and the direct view state operation instruction. The non-direct view state operation instruction inputted by the user is responded to when the user is no longer in the direct view state. The direct view state operation instruction inputted by the user is responded to when the user is detected in the direct view state again. For example, the television enters the "recording back of the user" state by voice instruction or other means. When the user is detected from the direct view state to side view state, the television automatically enters the recording mode. When the user rotates for one circle and faces the television again, the recording is stopped and the video playing mode is started to play the video just recorded.

In one embodiment, after the step of acquiring current image data of the user in real time by the image acquisition device, the method further includes:

In step 1, the image data when the user and the device are in the direct view state is acquired.

In step 2, the image data when the user and the device are in the direct view state is compared with the collected current image data.

In step 3, when the image data when the user and the device are in the direct view state is consistent with the collected current image data, the visual recognition technology and the speech recognition technology of the computer, and/or a preset operation are activated.

In particular, the preset corresponding visual recognition and the speech recognition technology functions of the computer are activated only when the user and the device are in the direct view state. Detecting whether the user and the device are in the direct view state can be performed by comparing the image data when the user and the device are in the direct view state with the collected current image data. When the image data when the user and the device are in the direct view state is consistent with the collected current image data, it means that the current user and the device are in the direct view state, the visual recognition and the speech recognition technology functions of the computer (such as gesture recognition, face recognition, and speech recognition, etc.) are activated. When the image data when the user and the device are in the direct view state is not consistent with the collected current image data, it means that the current user and the device are not in the direct view state, the visual recognition and the speech recognition technology functions of the computer will not be activated. In actual application, the device, for example, an air conditioner, collects the current image data of the user in real time by the camera to acquire the image data when the user and the air conditioner are in the direct view state. The image data when the user and the device are in the direct view state is compared with the collected current image data. When the image data when the user and the device are in the direct view state is consistent with the collected current image data, it means that the current user and the air conditioner are in the direct view state. The speech recognition technology, the face recognition technology, and the gesture recognition technology can be activated. The speech recognition technology is used to recognize the user speech instruction, face recognition technology is used to recognize the user identity, and the gesture recognition technology is used to recognize the user gesture instruction.

Figure 3:
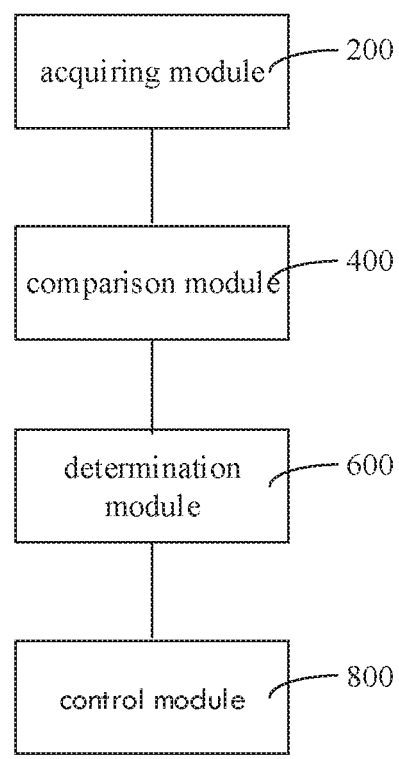
FIG. 3 is a schematic view of a human-computer interaction system based on a direct view according to a first embodiment of the present disclosure.

As shown in FIG. 3, a human-computer interaction system based on a direct view includes:

An acquiring module 200 is configured to acquire direct view image data collected by an image acquisition device when a user and a device are in a relative direct view state.

A comparison module 400 is configured to collect current image data of the user in real time by the image acquisition device, and comparing the collected current image data with the direct view image data.

A determination module 600 is configured to determine the user and the device being in the relative direct view state when the collected current image data is consistent with the direct view image data.

A control module 800 is configured to recognize behavior and intention of the user by a visual recognition technology and a speech recognition technology of a computer when the user and the device are in the relative direct view state. A control device performs an operation corresponding to the current behavior and the intention of the user according to a preset corresponding relationship between the current behavior and the intention of the user and the operation. The visual recognition technology and the speech recognition technology of the computer includes face recognition, speech recognition, semantic understanding, gesture recognition, lip recognition, voiceprint recognition, expression recognition, age recognition, card recognition, face tracking, pupil recognition, and iris recognition.

In the human-computer interaction system based on the direct view according to the present disclosure, the acquiring module 200 acquires the direct view image data collected by an image acquisition device when the user and the device are in the relative direct view state. The comparison module 400 acquires the current image data of the user and the collected current image data is compared with the direct view image data. When the collected current image data is consistent with the direct view image data, the determination module 600 determines the user and the device in the relative direct view state. The control module 800 recognizes the behavior and the intention of the user by the visual recognition technology and the speech recognition technology of the computer. The control device performs the operation corresponding to the current behavior and the intention of the user according to the preset corresponding relationship between the current behavior and the intention of the user and the operation. In the whole process, the image data collected by the image acquisition device is used for direct view determination, and the direct view state determination between the user and the device is taken as a precondition of human-computer interaction to ensure that the current user does have human-computer interaction requirement. The whole human-computer interaction process is natural. In addition, a variety of action recognition methods, such as, face recognition and speech recognition gesture recognition, lip recognition, voiceprint recognition, facial expression recognition, age recognition, card recognition pupil recognition and iris recognition are adopted to recognize the next action of the user, which can realize various human-computer interaction and bring convenient operation to users.

In one of the embodiments, the control module 800 includes:

A counting unit is configured to count time that the user and the device are in the relative direct view state. When the time that the user and the device are in the relative direct view state is greater than a preset time, the behavior and the intention of the user are recognized by the visual recognition technology and the speech recognition technology of the computer. The control device performs the operation corresponding to the current behavior and the intention of the user according to the preset corresponding relationship between the current behavior and the intention of the user and the operation.

In one of the embodiments, the control module 800 further includes:

A finding control unit is configured to find preset video image data matching with user identity, and the control device displays the found video image data.

In one of the embodiments, the control module 800 includes:

A recognition unit is configured to perform the speech recognition and the lip recognition to the user;

A control unit is configured to respond, by the control device, to the speech operation of the user, when a speech recognition result is consistent with a lip recognition result.

In one of the embodiments, the control module 800 includes:

A locating unit is configured to locate a face position of the user as a sound source position when the user is detected.

An adjusting unit is configured to orient a sound acquisition device towards the sound source position and collect user sound data.

An extracting control unit is configured to extract a speech operation instruction when the collected user sound data carries the speech operation instruction, and perform, by the control device, an operation corresponding to the speech operation instruction.

Figure 4:
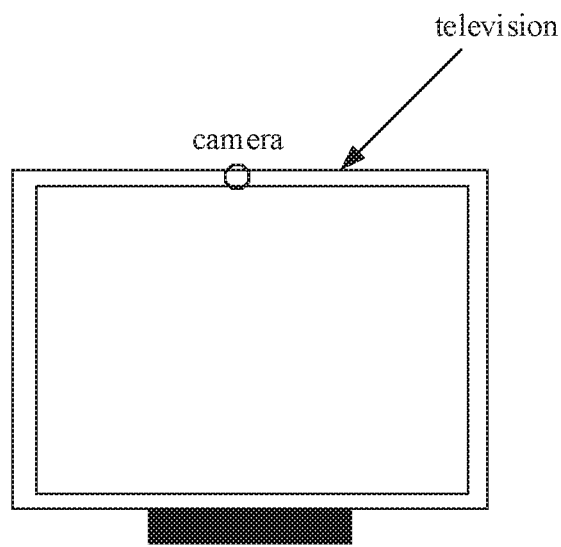
FIG. 4 is a specific application scenario of a human-computer interaction method and system based on a direct view according to the present disclosure.
Figure 4:
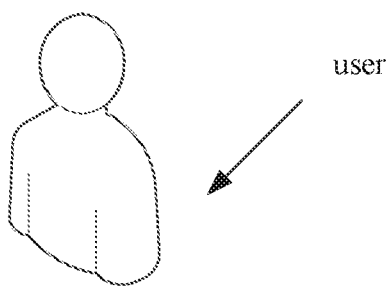

In order to further explain the technical scheme of the human-computer interaction method and system based on a direct view of the present disclosure in detail, a plurality of specific application examples will be adopted to simulate different actual application scenarios. FIG. 4 is also combined to explanation. In the following application examples, a device is a television.

Direct view image data collected by a camera as shown in FIG. 4 when a user and the device are in a relative direct view state is acquired.

Current image data in real time is collected by the camera as shown in FIG. 4, and the collected data in real time is compared with the direct view image data when the user and the device are in the relative direct view state.

When the collected data is consistent with the direct view image data, it is determined that the user and the television are in the relative direct view state.

Application example 1, direct view state+time.

The user and the television are in the relative direct view state for a certain time, for example, 2 seconds, it can be considered that the user wants to watch television program and the television may start to play the program from the standby, or may actively greet and communicate with the user.

Application Example 2, direct view state+time+face recognition.

The user identity is known and the program that the user likes can be played. The television can also actively call the user and actively communicate with the user.

Application example 3, direct view state+face identification+expression identification.

Obviously, the user identity is known, and his expression is known, so the television can actively communicate with the user, and even provide a corresponding service. If a child is crying in front of the television, the television can automatically call the video phone of her mother, and the television will soon show the video of her mother to allow the baby to communicate with the video of her mother.

Application example 4, direct view state+face recognition+speech recognition.

When face recognition confirms that there is only one user at the scene, the television can regard the speech recognition result as the user's reply and make corresponding reply and feedback to the user.

Application example 5, direct view state+face recognition+lip recognition+speech recognition.

If the face recognition confirms that there are a plurality of users in the scene, the user is judged whether in the "direct view state", the lip change of the "direct view" user is detected, and lip recognition is performed to the direct view user. At the same time, speech recognition is performed to the detected speech information. The lip recognition result is compared with the speech recognition result, if the lip recognition result is consistent with the speech recognition result, it can be determined that the direct view user is talking with the television, and the television makes a corresponding response. If the lip recognition result is not consistent with the speech recognition result, the television does not respond.

Application example 6, direct view state+array microphone+face recognition (or voiceprint recognition).

For example, when several people watch television, the several people and the television are in the direct view state. If the several people speak at the same time, future array microphones (which, like radar, tracking multiple targets) can record multiple sources. Direct view recognition can determine the number of several targets, the position information of the target sound sources are provided to the array microphones. Face identity recognition is combined to simultaneously collect the sounds of several people, and distinguish who speak the content.

Application Example 7, application to air conditioner.

The user looks at the air conditioner, the air conditioner management system confirms that the user is in the "direct view" state through the head posture estimation. The air conditioner activates face recognition to know the user identity. The air conditioner is turned on and adjusted to the state that the user likes. The air conditioner starts gesture recognition which can accept gesture operation of the user. The air conditioner starts recording and speech recognition which can accept voice command operation of the user.

The above-described embodiments represent only several embodiments of the present disclosure, the description of which is more specific and detailed, but is not to be construed as limiting the scope of the disclosure. It should be noted that, for those of ordinary skill in the art, several modifications and improvements can be made without departing from the concept of the present disclosure, which fall within the scope of the present disclosure. Therefore, the scope of protection of the disclosure patent shall be subject to the appended claims.

What is claimed is:

1. A human-computer interaction method based on a direct view, comprising steps of:
   acquiring direct view image data collected by an image acquisition device when a user and a device are in a relative direct view state, the image acquisition device being provided on a peripheral device, the peripheral device being coupled with the device, the direct view image data being data collected in a history record;
   collecting current image data of the user in real time by the image acquisition device, and comparing the collected current image data with the direct view image data after performing image processing and image object coordinate converting to the direct view image data;
   determining the user and the device being in the relative direct view state when the collected current image data is consistent with the direct view image data; and
   recognizing behavior and intention of the user by a visual recognition technology and a speech recognition technology of a computer when the user and the device are in the relative direct view state, calling, by a control device, a video phone according to user identity and expression, wherein the device is configured to communicate with the user actively by calling the user;
   wherein the visual recognition technology and the speech recognition technology of the computer comprises face recognition, speech recognition, semantic understanding, gesture recognition, lip recognition, voiceprint recognition, expression recognition, age recognition, card recognition, face tracking, pupil recognition, and iris recognition;
   wherein when the collected current image data is consistent with the direct view image data, prior to the step of determining the user and the device being in the relative direct view state, the method further comprises:
   locating a face position of the user as a sound source position when the user is detected; and
   orienting an array microphone towards sound source positions by tracking multiple targets, wherein a plurality of users are confirmed by the face recognition, a lip change of the user in the direct view state is detected, and the lip recognition is performed to the user in the direct view state;
   wherein the step of recognizing the behavior and the intention of the user by the visual recognition technology and the speech recognition technology of the computer comprises:
   collecting user sound data by the array microphone, wherein a face identity recognition is combined to identify authority of the user identity, and the user sound data sent only by an authorized user is collected;
   when the collected user sound data carries a speech operation instruction, extracting the speech operation instruction, and performing, by the control device, an operation corresponding to the speech operation instruction.

2. The human-computer interaction method based on the direct view of claim 1, wherein the step of recognizing the behavior and the intention of the user by the visual recognition technology and the speech recognition technology of the computer comprises:
   counting time that the user and the device are in the relative direct view state;
   when the time that the user and the device are in the relative direct view state is greater than a preset time, recognizing the behavior and the intention of the user by the visual recognition technology and the speech recognition technology of the computer, and performing, by the control device, an operation corresponding to the current behavior and the intention of the user according to a preset corresponding relationship between the current behavior and the intention of the user and the operation.

3. The human-computer interaction method based on the direct view of claim 2, wherein when the time that the user and the device are in the relative direct view state is greater than the preset time, after the step of recognizing the behavior and the intention of the user by the visual recognition technology and the speech recognition technology of the computer, the method further comprises:
    finding preset video image data matching with user identity, and displaying, by the control device, the found video image data.

4. The human-computer interaction method based on the direct view of claim 1, wherein the step of recognizing the behavior and the intention of the user by the visual recognition technology and the speech recognition technology of the computer comprises:
    performing the speech recognition and the lip recognition to the user;
    when a speech recognition result is consistent with a lip recognition result, responding, by the control device, to the speech operation of the user.

5. The human-computer interaction method based on the direct view of claim 1, wherein the step of recognizing the behavior and the intention of the user by the visual recognition technology and the speech recognition technology of the computer comprises:
    performing the speech recognition and the semantic understanding to the user;
    when a speech recognition result and a semantic understanding result are consistent with a current scene of the device, responding, by the control device, to the speech operation of the user.

6. The human-computer interaction method based on the direct view of claim 1, wherein when the collected current image data is consistent with the direct view image data, after the step of determining the user and the device being in the relative direct view state, the method further comprises:
    receiving an operation instruction inputted by the user, the operation instruction comprising a non-direct view state operation instruction and a direct view state operation instruction;
    responding to the non-direct view state operation instruction inputted by the user when detecting the user being no longer in the direct view state; and
    responding to the direct view state operation instruction inputted by the user when detecting the user being in the direct view state again.

7. The human-computer interaction method based on the direct view of claim 1, wherein after the step of acquiring current image data of the user in real time by the image acquisition device, the method further comprises:
    acquiring the image data when the user and the device are in the direct view state;
    comparing the image data when the user and the device are in the direct view state with the collected current image data; and
    when the image data when the user and the device are in the direct view state is consistent with the collected current image data, activating the visual recognition technology and the speech recognition technology of the computer, or a preset operation comprising recording and playing a video.

8. The human-computer interaction method based on the direct view of claim 1, wherein the device is one of an air conditioner, a robot, or a vehicle-mounted device.

* * * * *